United States Patent [19]
Laramay et al.

[11] Patent Number: 5,393,439
[45] Date of Patent: Feb. 28, 1995

[54] PERIODATE FRACTURING FLUID VISCOSITY BREAKERS

[75] Inventors: Steve B. Laramay; Lewis R. Norman, both of Duncan, Okla.

[73] Assignee: Halliburton Company, Duncan, Okla.

[21] Appl. No.: 266,291

[22] Filed: Jun. 27, 1994

[51] Int. Cl.$^6$ .............................................. E21B 43/26
[52] U.S. Cl. .................................... 507/211; 166/283; 166/308; 507/922; 507/924; 507/217; 507/267
[58] Field of Search ...................... 252/8.551; 166/283, 166/308

[56] References Cited

U.S. PATENT DOCUMENTS

| | | |
|---|---|---|
| 3,696,035 | 10/1972 | Nimerick . |
| 3,779,914 | 12/1973 | Nimerick . |
| 3,818,991 | 6/1974 | Nimerick . |
| 4,552,674 | 11/1985 | Brown et al. ................. 252/8.55 R |
| 4,560,486 | 12/1985 | Hinkel ............................ 252/8.55 R |

FOREIGN PATENT DOCUMENTS 542228 11/1992 European Pat. Off. .

OTHER PUBLICATIONS

Chemical Abstracts, vol. 107 CA 107:183630 (1987).
Chemical Abstracts, vol. 112 CA 112:115342 (1990).
Chemical Abstracts, vol. 112 CA 112:160898 (1990).
Chemical Abstracts, vol. 114 CA 114:185927 (1991), p. 836.
Chemical Abstracts, vol. 115 CA 115:154512.

*Primary Examiner*—Gary Geist
*Attorney, Agent, or Firm*—Robert A. Kent

[57] ABSTRACT

Fracturing fluids for hydraulically fracturing oil and gas bearing subterranean formations to increase flow of formation fluids into wells using a periodate or a metaperiodate salt as the viscosity breaker. The fracturing fluids are particularly advantageous when used in conjunction with curable resin-coated proppants and for fracturing subterranean formations which are at temperatures between about 50° F. and about 120° F., in conjunction with both uncured resin-coated proppants and other types of proppants.

10 Claims, No Drawings

PERIODATE FRACTURING FLUID VISCOSITY BREAKERS

BACKGROUND

1. Field

This invention relates generally to fluids and procedures for hydraulically fracturing subterranean formations to stimulate production of crude oil and natural gas from wells. More specifically, this invention relates to chemical agents called "breakers" which are added to fracturing fluids to reduce the viscosity of fracturing fluids when the fracturing procedure is completed.

2. Background Art

Crude oil and natural gas residing in subterranean porous formations are produced by drilling wells into the formations. Oil and/or natural gas flow into the well driven by the pressure gradient which exists between the formation and the well, gravity drainage, fluid displacement, and capillary action. Typically, surface pumps are required to supplement the natural driving forces to bring the hydrocarbons to the wellhead surface.

Most wells are hydraulically fractured to increase flow. The drill pipe casing section adjacent to the zone to be fractured is perforated using explosive charges or water jets. Then a fracturing fluid is pumped down the drill pipe at a rate and pressure high enough to fracture the formation. The fractures propagate from the well bore radially outward forming either or both vertical and horizontal cracks. Most fractures form vertical cracks in formations.

Solid particles called proppants are dispersed into the fracturing fluid. Proppants lodge in the cracks and hold them open after fracturing fluid hydraulic pressure is released and the fracturing fluid flows back into the well. Without proppants, the cracks would close and the increased permeability gained by the fracturing operation would be lost. To preclude the cracks from closing prematurely, proppants must have sufficient compressive strength to resist crushing, but also-must be sufficiently abrasion resistant and non-angular to preclude imbedding into the formation. The type and size of propping agents are usually selected to complement the characteristics of the formation being fractured.

In formations under moderate pressure, 6000 psi or less, the most commonly used propping agent is ordinary screened river sand. Special grades of silica sand are used. For formations with closure stresses above about 6000 psi, resin-coated sand proppants are preferred. These are high quality silica sands which have been coated with a thermoset phenolic resin. The resin coating imparts an optimum crush resistance and compressibility to the sand particles to optimize propping action. There are two types of resin coatings: those that cure in-situ; and those that are precured. Curable coatings generally are used where proppant flow-back can occur.

Fracturing fluids are water-based compositions containing a hydratable high molecular weight polymeric gelling material which increases the viscosity of the fluid. The fluid must be thickened to reduce leakage from the fracture fissures during fracturing and to suspend the proppant. A wide variety of hydratable viscosifiers are used in fracturing fluid formulations including polysaccharides, polyacrylamides and polyacrylamide copolymers. Polysaccharides are currently favored. Particularly desirable polysaccharides include galactomannan gums, derivatives thereof, and cellulose derivatives. Specific polysaccharides include guar gum, locust bean gum, carboxymethylguar, hydroxyethylguar, hydroxypropylguar, carboxymethylhydroxypropylguar, carboxymethylhydroxyethylguar, sodium hydroxymethyl cellulose, sodium-hydroxymethyl cellulose, sodium carboxymethylhydroxyethyl cellulose, and hydroxyethyl cellulose. Generally, the molecular weights of the hydratable polymers used in fracturing fluids range from about 500,000 to about 3,000,000. The ratio of apparent viscosity of the fracturing fluid relative to water at shear rates encountered in well fractures is between about 500 to 1000.

The amount of viscosifier employed depends on the desired working viscosity of the fluid and the downhole temperature of the formation to be fractured. Typically, from about 10 to 100 lbs of viscosifier per 1000 gallons of fracturing fluid is employed.

Viscosity generally decreases with temperature, so the viscosifier concentration would have to be increased to achieve a required viscosity in the formation. However, the amount of thickener required can make the fracturing fluid difficult to formulate and pump. Crosslinking the polysaccharide provides a better solution. Polysaccharides contain hydroxyl groups in the cis form on adjacent carbon atoms which can be crosslinked to increase fracturing fluid viscosity. Crosslinking is particularly useful for fracturing higher temperature formations, those over 200° F.

Common crosslinking agents include polyvalent ions in their high valance state such as Ti(IV) and Zr(IV). Also, borate ions are effective crosslinkers for polysaccharides.

When the fracturing operation is complete, the fracturing fluid must be expelled from the fissures so that production of oil or gas can begin. The viscosity of the fracturing fluid preferably is reduced ("broken") so that it can flow back out of the fissures and into the well. Hydratable polymers may decompose spontaneously in time from either bacteriological or thermal degradation. But, at formation temperatures below about 225° F., the natural degradation is too slow and too much production time is lost. Accordingly, for wells below about 225° F., a chemical agent referred to as a "breaker" is added to the fracturing fluid to accelerate viscosity reduction. Breakers operate by breaking the backbone chain of the hydrated polymer. Breakers may be added to the fracturing fluid at the surface "on-the-fly" as the fluid is being pumped down the well. Ideally, the breaker should be dormant until the fracturing operation has been completed, and then the breaker should rapidly reduce the fluid viscosity. Enzyme breakers such as alpha and beta amylases, amyloglucosidase, oligoglucosidase invertase, maltase, cellulase, and hemicellulose are commonly used for wells having a bottomhole temperature below about 150° F. and with fracturing fluids with pH between about 3.5 and 8. Enzymes catalyze the hydrolysis of glycosidic bonds between the monomer units of polysaccharides.

Peroxygen compounds are the preferred breakers for higher temperature formations. They form free radicals which break the backbone of gel polymer chains. Peroxides generally decompose over a narrow temperature range characteristic of the peroxide. Accordingly, premature viscosity breaking generally may be precluded by selecting a peroxygen with a decomposition temperature close to the temperature in the fractured formation so that peroxide does not decompose until it is heated to formation temperature. Commonly used peroxygen breakers include dichromates, permanganates, peroxydisulfates, sodium perborate, sodium carbonate peroxide, hydrogen peroxide, tertiarybutylhydroperoxide, potassium diperphosphate, and ammonium and alkali metal salts of dipersulfuric acid. Typical breaker addition rates range from about 2 to 10 lbs. per thousand gallons of fracturing fluid.

The most common oxidative breakers are peroxydisulfates ($S_2O_8^=$) which decompose into highly reactive sulfate radical anions. Decomposition is slow below 120° F., but can be accelerated by adding amines. Peroxydisulfates decompose rapidly above 125° F. The amount of peroxydisulfate required decreases with increasing formation temperature. As little as 0.25 lb per 1000 gal is required at 200° F.

For higher temperature formations, peroxygens with correspondingly higher decomposition temperatures could be used.

Other chemicals added to fracturing fluids include bactericides to repress bacteria growth, oxygen, or free radical scavengers, such as methanol or sodium thiosulfate, to inhibit premature breaking, and a surfactant to repress foaming.

It has been observed that curable resin-coated proppants may interfere with the viscosity breaking action of peroxy breakers in fracturing fluids incorporating polysaccharide viscosifiers. For example, a ten-fold increase in the addition rate of persulfate breaker is required when using a curable resin-coated sand proppant relative to the amount required when using uncoated sand or bauxite proppant.

It is also known that enzyme and peroxygen breakers do not effectively reduce the viscosity of fracturing fluids incorporating polysaccharide viscosifiers in formations which are at low to moderate temperatures, that is, temperatures from about 50° F. to about 120° F. The low temperature viscosity breaking problem is discussed in U.S. Pat. No. 4,560,486, which teaches using a partially water soluble tertiary amine in conjunction with ammonium persulfates or alkali metal persulfates to break the viscosity breaker of fracturing fluids containing polysaccharide viscosifiers in formations in the 50° F. to 120° F. temperature range. In U.S. Pat. No. 4,552,672, Brown et al. report that the minimum practical temperature for peroxygen breakers can be decreased from 50° C. to about 20° C. by adding a soluble metal salt to accelerate peroxide decomposition, but that peroxide decomposition in the presence of metals is difficult to control and reproduce, and that adding metals makes the breaking unacceptable, erratic, and unreproduceable.

For the foregoing reasons there is a need for fracturing fluid breakers which can effectively break the viscosity of fracturing fluids comprising a polysaccharide viscosifier in conjunction with curable resin-coated proppants. There is also need for fracturing fluid breakers which effectively break the viscosity of fracturing fluids comprising polysaccharide viscosifiers in formations at temperature formations in problematic 50° F. to 120° F. range.

SUMMARY

The present invention is directed to fracturing fluid compositions that utilize a new viscosity breaker which functions effectively in the presence of uncured resin-coated proppants. Surprisingly, the new fracturing fluids also exhibit superior viscosity breaking performance in the problematic 50° F. to 120° F. formation temperature range both with uncured resin proppants and with other proppants.

The present invention is directed to polysaccharide viscosified fracturing fluids in which a water soluble salt of the periodate or metaperiodate radicals is incorporated to break the viscosity of the fracturing fluid. The periodate or metaperiodate radical can be added to the fracturing fluid in the form of any water soluble salt such as the alkali metal or alkaline earth salts. Potassium periodate is particularly favored because it can be purchased in an industrial grade and in bulk quantities at reasonable price. The present invention also encompasses the fracturing processes which apply polysaccharide viscosified fracturing fluids containing periodate or metaperiodate breakers.

These and other features, aspects and advantages of the present invention will become better understood with reference to the following description and appended claims.

DETAILED DESCRIPTION AND PREFERRED EMBODIMENTS

Without intending to be limited by a specific theory, it is hypothesized that uncured resin coating on proppants release phenolic derivatives and residues which are free radical traps which consume the free radicals emitted by peroxy breakers, thus interfering with the free radical viscosifier polymer breaking reactions. Accordingly, it would be desirable to provide a fracturing fluid viscosity breaker which does not operate via the free radical mechanism when resin-coated proppants are to be used.

It has now been discovered that the salts of periodate and metaperiodate radicals are effective viscosity breakers in fracturing fluids comprising polysaccharides in conjunction with uncured resin-coated proppants. Surprisingly, it has also been discovered that the soluble salts as of periodate and metaperiodate radicals are effective viscosity breakers in formations which have temperatures in the problematic 50° F. to 120° F. range, both in conjunction with uncured resin-coated proppants and with other types of proppants.

Suitable periodate and metaperiodate salts include the alkali and alkaline earth salts. Potassium periodate, $KIO_4$, is a preferred agent. Periodates and metaperiodates break the polysaccharided chains via an oxidation mechanism, not a free radical mechanism. Periodates form periodate esters of the 1,2 diol bonds in the polysaccharide which disproportionates to form the dialdehyde and iodate anion.

To further illustrate the invention and how the invention may be applied, the following Examples are provided.

EXAMPLE 1

Break Times in Low Temperature Borate Crosslinked Guar Fluids

The static break test procedure was used to determine the time required to break a borate crosslinked guar fluid that is suitable for use at lower formation temperatures using potassium periodate as the breaker. The fluid used was guar (0.48%) crosslinked with "POLYBOR" crosslinker. ("POLYBOR" is a borate crosslinker sold by U.S. Borax Co.) The pH of the fluid was adjusted to pH 9.5 with acetic acid and caustic to facilitate crosslinking.

Tests were conducted at temperatures of 80° F., 100° F. and 120° F. and at potassium periodate loadings ranging between 0.25 and 7.0 lb./Mgal. The static break tests were conducted by adding potassium periodate to the fluid, then heating the fluid in a water bath at the temperature indicated in Table 1. The viscosity of the fluid was monitored using a viscometer such as a "BAROID MODEL 35 A FANN" viscometer. The break time is defined as the elapsed time for the fluid viscosity to decrease below 10 cP at 511 s$^{-1}$.

TABLE 1

| Entry | Test Temperature 0° F. | KIO$_4$ lb/Mgal | Break Time hours |
| --- | --- | --- | --- |
| 1 | 80 | 2 | 24 |
| 2 | 80 | 5 | 8 |
| 3 | 80 | 7 | 6 |
| 4 | 100 | 0.5 | 17 |
| 5 | 100 | 1 | <17 |
| 6 | 100 | 3 | 3 |
| 7 | 100 | 5 | 2 |
| 8 | 120 | 0.25 | 24 |
| 9 | 120 | 0.5 | 6 |
| 10 | 120 | 0.75 | 2 |
| 11 | 120 | 1 | 2 |

The results demonstrate that potassium periodate breaks fracturing fluids below 120° F. without the need of an activator. The break time of the fluid can be varied By controlling the concentration of potassium periodate.

The experiments of Examples 2 to 5 which follow were conducted using five commercial curable resin-coated proppants (RCP's) coded as follows: RCP "A" is "ACFRAC CR"; RCP "B" is "ACFRAC ULTRA"; RCP "C" IS "SUPER HS"; RCP "D" is "STRATA-FLEX"; and RCP "E" is "SANTRO SUPER HS".

EXAMPLE 2

Effect of Type of Curable Resin-Coated Proppant on Fluid Break Time Using Potassium Periodate Static break tests were conducted to determine if potassium periodate was generally effective in the presence of RCP's. The tests were conducted at 150° F. and the resin-coated proppant was slurried in the fluid at a concentration of 50% by weight. The potassium periodate concentration was 0.012% by weight in each test. The fluid designated "GUAR-BO$_4$" in Table 2 was a guar (0.48 wt. %) gel crosslinked with "POLYBOR" crosslinker. The pH of the fluid was adjusted to pH 10 with acetic acid and caustic to facilitate crosslinking. The fluid designated "CMHPG-Zr(IV)" in Table 2 was a carboxymethyl-hydroxypropyl-guar (0.48 wt. %) gel crosslinked with zirconium(IV) lactate crosslinker. The pH of the fluid was adjusted to pH 6.5 with acetic acid..

TABLE 2

| Entry | Fluid Type | Resin-Coated Proppant | Break Time hours |
| --- | --- | --- | --- |
| 1 | Guar-BO$_4^-$ | none | 1 |
| 2 | Guar-BO$_4^-$ | A | 1.5 |
| 3 | Guar-BO$_4^-$ | B | 1 |
| 4 | Guar-BO$_4^-$ | C | 1 |
| 5 | Guar-BO$_4^-$ | D | 1 |
| 6 | CMHPG-Zr(IV) | none | 7 |
| 7 | CMHPG-Zr(IV) | A | 7 |
| 8 | CMHPG-Zr(IV) | B | 7 |
| 9 | CMHPG-Zr(IV) | C | 7–24 |

TABLE 2-continued

| Entry | Fluid Type | Resin-Coated Proppant | Break Time hours |
| --- | --- | --- | --- |
| 10 | CMHPG-Zr(IV) | D | 4 |

The results demonstrate that potassium periodate is an effective breaker for commercial curable resin-coated proppants.

EXAMPLE 3

Break Times Vs. Potassium Periodate Loadings With Combinations of Different Fluids, Resin-Coated Proppants and Temperatures Static break tests were performed to determine potassium periodate loadings required to break fluids for a number of combinations of different fluid compositions, types of resin-coated proppants, fluid types, temperatures, and static break. The tests were conducted were conducted at 150° F. or 175° F. and the resin-coated proppant was slurried in the fluid at concentrations of 38%, 50%, or 55% by weight.

The fluid designated Guar-BO$_4$— in Table 3 was a guar (0.48%) gel crosslinked with POLYBOR. The pH of the fluid was adjusted to pH 10 with acetic acid and caustic to facilitate crosslinking. The fluid designated CMHPG-Zr(IV) in Table 3 was a carboxymethyl-hydroxypropyl-guar (0.48%) gel crosslinked with zirconium(IV) lactate crosslinker. The pH of the fluid was adjusted to pH 6.5 with acetic acid.

TABLE 3

| Entry | Fluid Type | Temp. °F. | RCP Type | RCP lb/gal | KIO$_4$ lb/Mgal | Break Time hours |
| --- | --- | --- | --- | --- | --- | --- |
| 1 | Guar-BO$_4^-$ | 150 | A | 5 | 0.5 | 2 |
| 2 | Guar-BO$_4^-$ | 150 | A | 5 | 0.75 | 1 |
| 3 | Guar-BO$_4^-$ | 150 | A | 5 | 1 | 1 |
| 4 | Guar-BO$_4^-$ | 150 | A | 5 | 1.5 | 0.5 |
| 5 | Guar-BO$_4^-$ | 150 | A | 10 | 0.5 | >6 |
| 6 | Guar-BO$_4^-$ | 150 | A | 10 | 0.75 | 2 |
| 7 | Guar-BO$_4^-$ | 150 | A | 10 | 1 | 1 |
| 8 | Guar-BO$_4^-$ | 150 | A | 10 | 1.5 | 1 |
| 9 | Guar-BO$_4^-$ | 175 | A | 5 | 0.25 | >6 |
| 10 | Guar-BO$_4^-$ | 175 | A | 5 | 0.5 | 4 |
| 11 | Guar-BO$_4^-$ | 175 | A | 5 | 0.75 | 2 |
| 12 | Guar-BO$_4^-$ | 175 | A | 5 | 1 | 5 |
| 13 | Guar-BO$_4^-$ | 150 | C | 8 | 0.5 | >6 |
| 14 | Guar-BO$_4^-$ | 150 | C | 8 | 1 | 1 |
| 15 | Guar-BO$_4^-$ | 150 | C | 8 | 1.5 | 0.5 |
| 16 | CMHPG-Zr(IV) | 150 | A | 5 | 0.5 | >8 |
| 17 | CMHPG-Zr(IV) | 150 | A | 5 | 1 | 4 |
| 18 | CMHPG-Zr(IV) | 150 | A | 5 | 2 | 1 |
| 19 | CMHPG-Zr(IV) | 150 | A | 5 | 3 | 0.5 |
| 20 | CMHPG-Zr(IV) | 150 | A | 10 | 0.5 | >8 |
| 21 | CMHPG-Zr(IV) | 150 | A | 10 | 1 | 4 |
| 22 | CMHPG-Zr(IV) | 150 | A | 10 | 2 | 1 |
| 23 | CMHPG-Zr(IV) | 150 | A | 10 | 3 | 1 |
| 24 | CMHPG-Zr(IV) | 175 | A | 5 | 1 | >24 |
| 25 | CMHPG-Zr(IV) | 175 | A | 5 | 1.5 | 1 |
| 26 | CMHPG-Zr(IV) | 175 | A | 5 | 2 | 1 |
| 27 | CMHPG-Zr(IV) | 175 | A | 10 | 0.5 | >24 |
| 28 | CMHPG-ZR(IV) | 175 | A | 10 | 1 | 2 |

TABLE 3-continued

| Entry | Fluid Type | Temp. °F. | RCP Type | RCP lb/gal | KIO4 lb/Mgal | Break Time hours |
|---|---|---|---|---|---|---|
| 29 | CMHPG-Zr(IV) | 175 | A | 10 | 1.5 | 1 |
| 30 | CMHPG-Zr(IV) | 175 | A | 10 | 2 | 1 |
| 31 | CMHPG-Zr(IV) | 150 | C | 8 | 0.5 | >24 |
| 32 | CMHPG-Zr(IV) | 150 | C | 8 | 1 | 4 |
| 33 | CMHPG-Zr(IV) | iso | C | 8 | 1.5 | 2 |
| 34 | CMHPG-Zr(IV) | 150 | C | 8 | 2 | 1 |
| 35 | CMHPG-Zr(IV) | 175 | C | 8 | 0.5 | 24 |
| 36 | CMHPG-Zr(IV) | 175 | C | 8 | 1 | 2 |
| 37 | CMHPG-Zr(IV) | 175 | C | 8 | 1.5 | 1 |

The results demonstrate that potassium periodate is effective in a wide variety of combinations of fluids, temperatures, and RCP types and concentrations. Break times can be varied by varying the concentration of potassium periodate.

EXAMPLE 4

Break Times of Fluids Containing Potassium Periodate and Resin-Coated Proppants with Temperature Ramped from 80°–170° F.[1]

These tests were conducted as in Example 3 except the bath temperature was ramped from 80° F. to 170° F. at a rate of 30° F./hour. After reaching 170° F., the bath was kept at this temperature.

TABLE 4

| Entry | Fluid Type | RCP | RCP lb/gal | KIO4 lb/Mgal | Break Time hours |
|---|---|---|---|---|---|
| 1 | Guar-BO4− | A | 8 | 0.5 | >24 |
| 2 | Guar-BO4− | A | 8 | 1 | 4 |
| 3 | Guar-BO4− | A | 8 | 2 | 2 |
| 4 | Guar-BO4− | B | 8 | 0.5 | >24 |
| 5 | Guar-BO4− | B | 8 | 1 | 4 |
| 6 | Guar-BO4− | B | 8 | 2 | 2 |
| 7 | Guar-BO4− | C | 8 | 0.5 | >24 |
| 8 | Guar-BO4− | C | 8 | 1 | 4 |
| 9 | Guar-BO4− | C | 8 | 2 | 2 |
| 10 | Guar-BO4− | E | 8 | 0.5 | >24 |
| 11 | Guar-BO4− | E | 8 | 1 | 2 |
| 12 | Guar-BO4− | E | 8 | 2 | 2 |
| 13 | CMHPG-Zr(IV) | A | 8 | 0.5 | >24 |
| 14 | CMHPG-Zr(IV) | A | 8 | 1 | 4 |
| 15 | CMHPG-Zr(IV) | A | 8 | 2 | 2 |
| 16 | CMHPG-Zr(IV) | B | 8 | 0.5 | >24 |
| 17 | CMHPG-Zr(IV) | B | 8 | 1 | 6 |
| 18 | CMHPG-Zr(IV) | B | 8 | 2 | 2 |
| 19 | CMHPG-Zr(IV) | C | 8 | 0.5 | >24 |
| 20 | CMHPG-Zr(IV) | C | 8 | 1 | 4 |
| 21 | CMHPG-Zr(IV) | C | 8 | 2 | 2 |
| 22 | CMHPG-Zr(IV) | E | 8 | 0.5 | >24 |
| 23 | CMHPG-Zr(IV) | E | 8 | 1 | 4 |
| 24 | CMHPG-Zr(IV) | E | 8 | 2 | 2 |

EXAMPLE 5

Effect of Potassium Periodate on Compressive Strength of Curable Resin-Coated Proppants To determine the compatibility of the potassium periodate and the curable resin-coated proppant, compressive strength tests were conducted with and without potassium periodate. In these tests, the resin-coated proppant was slurred in a 0.48% CMHPG gel. The concentration of proppant was 65%. The resin-coated proppant was allowed to settle, then the excess fluid was removed. The proppant was encased in a cell that was pressured to 1000 psi. The cells were placed in a 200° F. preheated oven for 20 hours. After cooling to room temperature, the consolidated proppant was removed from the cell. The load required to crush the consolidated proppant was determined. The compressive strength (psi) was calculated.

TABLE 5

| Entry | RCP | KIO4 lb/Mgal | Compressive Strength psi |
|---|---|---|---|
| 1 | A | 0 | 1995 |
| 2 | A | 1 | 1947 |
| 3 | B | 0 | 201 |
| 4 | B | 1 | 224 |
| 5 | C | 0 | 737 |
| 6 | C | 1 | 817 |
| 7 | D | 0 | 497 |
| 8 | D | 1 | 434 |

The results of these tests clearly demonstrate that potassium does not influence the developed compressive strength of the curable resin-coated proppant.

EXAMPLE 6

Typical (Prospective) Application of Invention

About 20,000 gallons of water from a local source is added to a frac tank located near the well that is to be hydraulically fractured. About one pound of a bactericide, 2,2 dibromonitrilopropionamide, is deposited in the frac tank before the water is charged into the frac tank. The water is recirculated from the bottom of the tank to the top using a centrifugal pump. About 800 lbs. of a CMHPG, a modified guar viscosifier, is added to the recirculating water to hydrate the thickener. Then, the pH of the fracturing fluid is adjusted to 6.5 by adding acetic acid to the recirculating fracturing fluid.

To commence the fracturing operation, the fracturing fluid is pumped from the frac tank to a small mixing tank which is equipped with a rotating mixer. The fracturing fluid is pumped from the mixing tank to the suction of the high pressure downhole pump using a centrifugal pump. Simultaneously, about 10,000 lbs. of the resin-coated proppant is fed into the mixing tank at a controlled uniform rate using an auger feeder where it is blended into the fracturing fluid. About 80 lbs. of zirconium (IV) lactate, the cross-linker, and 20 lbs. of potassium periodate, the breaker, are fed uniformly at a controlled rate into the fracturing fluid at the suction of the centrifugal transfer pump. The pressure at the discharge of the high pressure downhole pump is about 10,000 psi. The pressurized fracturing fluid opens cracks in the subterranean formation and flows into the fissures.

When the batch of fracturing fluid has been pumped down the well, the downhole pump is shutdown, the well is shut in by closing a valve on the downhole pump discharge typically for between about six to twenty hours. During the shutin period, fluid pressure in the well falls as the fracturing fluid flows into the fissures in the formation. The formation cracks close against the proppant but the proppant maintains open pathways for flow. By the end of the shutin period, the viscosity breaker has functioned to reduce the viscosity of the viscosifier. When the shutin valve on the surface is opened, the now thinned fracturing fluid reverses flow direction and flows out of the formation cracks back into and up the well, leaving the proppant in the fissures. The fracture fluid is collected at the surface, treated and disposed. Oils and/or gas production proceeds.

Although the present invention has been described in considerable detail with reference to certain preferred versions thereof, other versions are possible. Therefore, the scope of the appended claims should not be limited to the description of the preferred versions herein.

What is claimed is:

1. A fracturing fluid comprising
   water,
   a polysaccharide viscosifier,
   a crosslinking agent, and
   at least one viscosity breaker selected from the group consisting of a salt of a periodate and a salt of a metaperiodate.

2. The fracturing fluid of claim 1, further comprising a proppant coated with a curable resin.

3. The fracturing fluid of claim 1, wherein the crosslinking agent is selected from the group consisting of borates, zirconium and titanium.

4. The fracturing fluid of claim 1, wherein the viscosity breaker is selected from the group consisting of alkali periodates, alkaline earth periodates, alkali metaperiodates and alkaline earth metaperiodates.

5. The fracturing fluid of claim 1, wherein the viscosity breaker is potassium periodate.

6. A method for fracturing a subterranean formation penetrated by a well bore comprising pumping the fracturing fluid of claim 1 into the well bore and into contact with the formation.

7. The well fracturing procedure of claim 6, wherein the fracturing fluid further comprises a proppant coated with an uncured resin.

8. The well fracturing procedure of claim 6, wherein the fracturing fluid comprises a crosslinking agent selected from the group consisting of a borate, zirconium and titanium.

9. The well fracturing procedure of claim 6, wherein the viscosity breaker is potassium periodate.

10. The well fracturing procedure of claim 6, wherein the temperatures in the subterranean formation being fractured are in the temperature range of about 50° F. to about 120° F.

* * * * *